United States Patent
Cai et al.

(10) Patent No.: US 6,349,363 B2
(45) Date of Patent: *Feb. 19, 2002

(54) MULTI-SECTION CACHE WITH DIFFERENT ATTRIBUTES FOR EACH SECTION

(75) Inventors: Zhong-ning Cai, Portland, OR (US); Tosaku Nakanishi, Saratoga, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,278

(22) Filed: Dec. 8, 1998

(51) Int. Cl.$^7$ .............................................. G06F 12/08
(52) U.S. Cl. ..................................................... 711/129
(58) Field of Search ................... 711/129, 133, 711/134, 142, 143

(56) References Cited

U.S. PATENT DOCUMENTS

| | | | |
|---|---|---|---|
| 4,905,141 A | * 2/1990 | Brenza | 364/200 |
| 5,479,636 A | 12/1995 | Vanka et al. | |
| 5,551,027 A | * 8/1996 | Choy et al. | 395/600 |
| 5,809,524 A | 9/1998 | Singh et al. | |
| 5,875,464 A | * 2/1999 | Kirk | 711/129 |
| 5,960,194 A | * 9/1999 | Choy et al. | 395/613 |
| 5,963,972 A | * 10/1999 | Calder et al. | 711/129 |
| 5,966,726 A | * 10/1999 | Sokolov | 711/113 |
| 6,058,456 A | * 5/2000 | Arimilli et al. | 711/129 |
| 6,061,763 A | * 5/2000 | Rubin et al. | 711/129 |
| 6,112,280 A | * 8/2000 | Shah et al. | 711/129 |
| 6,182,194 B1 | * 1/2001 | Uemura et al. | 711/133 |
| 6,205,519 B1 | * 3/2001 | Aglietti et al. | 711/133 |
| 6,269,425 B1 | * 7/2001 | Mounes-Toussi et al. | 711/133 |
| 6,295,580 B1 | * 9/2001 | Sturges et al. | 711/129 |

FOREIGN PATENT DOCUMENTS

EP    0 856 797 A1    8/1998

OTHER PUBLICATIONS

Gary Tyson et al., A Modified Approach to Data Cache Management, Proceedings of MICRO–28, pp. 93–103 (Dec. 1995).
Jude A. Rivers et al., On Effective Data Supply for Multi-Issue Processors*, Proceedings of the 1997 ICCD, pp. 1–10, (Oct. 1997).
Robert Stepanian, Digital Strong Arm SA–1500, Presentation at Microprocessor Forum 1997, pp. 1–8 (Oct. 1997).
Dongwook Kim et al., A Partitioned on–Chip Virtual Cache for Fast Processors, Journal of Systems Architecture, 519–529 (Nov. 1996).

* cited by examiner

Primary Examiner—Kevin Verbrugge
(74) Attorney, Agent, or Firm—Trop, Pruner & Hu, P.C.

(57) ABSTRACT

A system includes multiple program execution entities (e.g., tasks, processes, threads, and the like) and a cache memory having multiple sections. An identifier is assigned to each execution entity. An instruction of one of the execution entities is retrieved and an associated identifier is decoded. Information associated with the instruction is stored in one of the cache sections based on the identifier.

20 Claims, 5 Drawing Sheets

MULTI-SECTION CACHE WITH DIFFERENT ATTRIBUTES FOR EACH SECTION

BACKGROUND

The invention relates to buffer memory management in a system having multiple execution entities.

A buffer memory can be a relatively small, fast memory placed between a memory and another device that is capable of accessing the memory. An example of a buffer memory is a cache memory located between a processor and system memory (which typically is relatively large and slow) to reduce the effective access time required by the processor to retrieve information from the system memory. In some systems, a multi-level cache system may be used for further performance improvement. A first-level cache (L1 cache) may be implemented in the processor itself, and a second-level, typically larger cache (L2 cache) is externally coupled to the processor.

Further, in some conventional memory systems, a cache memory may include separate instruction and data cache units, one to store instructions and the other to store data. During operation, a processor may fetch instructions from system memory to store in the instruction cache unit. Data processed by those instructions may be stored in the data cache unit. If information, such as instruction or data, requested by the processor is already stored in cache memory, then a cache memory hit is said to have occurred. A cache memory hit reduces the time needed for the processor to access information stored in memory, which improves processor performance.

However, if information needed by the processor is not stored in cache memory, then a cache miss is said to have occurred. When a cache miss occurs, the processor has to access the system memory to retrieve the desired information, which results in a memory access time performance reduction while the processor waits for the slower system memory to respond to the request. To reduce cache misses, different cache management policies have been implemented. One of several mapping schemes may be selected, for example, including a direct mapping scheme or a set associative cache mapping scheme. A set associative cache memory that implements k-way associative mapping, e.g., 2-way associative mapping, 4-way associative mapping, and so forth, generally provides a higher hit ratio than direct mapped cache memory. One of several replacement policies may also be specified to improve cache memory hit ratios, including a first-in-first-out (FIFO) or least recently used (LRU) policy. Another feature of a cache memory that may be configured is the cache memory update policy that specifies how the system memory is updated when a write operation changes the contents of the cache. Update policies include a write-through policy or a write-back policy.

Conventionally, a system, such as a computer, may include multiple application programs and other software layers that have different data flow needs. For example, a program execution entity, such as a process, task, or thread, associated with a multimedia application may transfer large blocks of data (e.g., video data) that are typically not reused. Thus, access of these types of data may cause a cache to fill up with large blocks of data that are not likely to be reused.

In filling a cache memory, data used by one execution entity may replace data used by another execution entity, a phenomenon referred to as data cache pollution. Data cache pollution caused by the activities of one execution entity may increase the likelihood of cache misses for another execution entity, which may reduce overall system performance.

A need thus exists for a memory architecture that provides improved memory performance.

SUMMARY

In general, according to an embodiment, a system includes a processor and a plurality of execution entities executable on the processor. A buffer memory in the system has multiple buffer sections. Each buffer section is adapted to store information associated with requests from a corresponding one of the multiple execution entities.

Other features will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

Some embodiments of the invention include a system having a buffer memory that includes several individual buffer sections at one level of the memory hierarchy. Each buffer section may be a separate buffer module or may be a portion of a buffer memory that is separately addressable (that is, memory is separated into different address spaces). The individual buffer sections may be separately configurable and may be assigned to store information of different program execution entities in the system. Such a buffer memory may be referred to as a multi-unit buffer memory.

In some embodiments, the buffer memory may include a cache memory used in any of a variety of applications, e.g., processor subsystems, peripheral device controllers (such as video controllers, hard disk drive controllers, and so forth), and other types of control devices. Systems including such cache memories may include a general-purpose or special-purpose computer, a hand-held electronic device (e.g., telephones, calendar systems, electronic game devices, and the like), appliances, set-top boxes, and other electronics systems. A cache memory having multiple cache sections may be referred to as a multi-unit cache memory. A cache memory section may include a separate cache module or a portion of the cache memory that is separately addressable. The following described embodiments include a computer having a multi-unit cache memory with multiple independent cache modules—it is to be understood, however, that further embodiments may include computers having multi-unit cache memories with other independently configurable cache sections or other types of systems with buffer memories.

According to some embodiments, the attributes of each individual cache module in a multi-unit cache memory may be independently configurable. Such attributes may include each cache module's size, organization (e.g., direct mapped versus set associative mapping), replacement policy, update policy, and so forth. Thus, for example, one cache module may be configured to be a direct mapped cache while another cache module may be configured as a k-way set associative cache. The cache modules may also be configured to have different update policies, including a write-through policy or a write-back policy. Other attributes may also be set differently for the different cache modules, as further described below.

Some processors may be capable of receiving requests from multiple execution entities for processing. A processor may include, by way of example, a general-purpose or a special-purpose microprocessor, a microcontroller, or other types of control devices such as application-specific integrated circuits (ASICs), programmable gate arrays (PGAs), and the like. A program execution entity according to one embodiment may be the basic unit of work of software and firmware layers that are loaded in the system. Such basic units of work may include processes, tasks, threads, or other units, as definable according to different systems. For example, in some operating systems, such as certain Windows® operating systems by Microsoft Corporation, multiple threads associated with processes in the system may be executable by the processor to perform different operations. Another operating system that offers multithreading or multitasking capabilities is the Be Operating System (BeOS) from BE, Inc., as described in the BE Operating System Product Data Sheet, published in 1998.

In such operating systems, multiple execution entities associated with different software and firmware layers may be active at a time. Requests from these execution entities are scheduled by the operating system according to a predetermined priority protocol, e.g., round-robin, etc. Such operating systems are said to be multitasking or multithreading operating systems. To take advantage of the multitasking or multithreading capabilities of a system, the independent cache modules of a multi-unit cache memory may be assigned to store information of corresponding execution entities. Thus, for example, execution entities of a multimedia application may be assigned to one cache module, while execution entities of other applications may be assigned to different cache modules of the multi-unit cache memory. To that end, according to one embodiment, requests from each execution entity may be assigned to different execution entity identifiers (EIDs). Thus, requests from execution entities of a first application may be assigned to one EID, and requests from another execution entity may be assigned another EID. Thus, according to this embodiment, a cache module may be configured for the general data usage behavior of an assigned application.

In another embodiment, the execution entities created by one software or firmware layer may further be subdivided to have multiple EIDs. For example, an application may create execution entities that process data according to different temporal and spatial locality characteristics. For example, some execution entities may be more likely to reuse data than other execution entities created by the same application. Thus, it may be beneficial to further separately assign these different execution entities to different cache modules in the multi-unit cache memory. Thus, in one alternative embodiment, requests from different execution entities of one application may be assigned more than one EID so that different cache modules may be utilized. In addition, execution entities of different applications may be assigned the same EID. Thus, for example, a first execution entity of a multimedia application may be assigned EID 1, while a second execution entity of the multimedia application may be assigned EID 2. In the same system, execution entities of a spreadsheet application having similar data usage characteristics as the second execution entity of the multimedia application may also be assigned EID 2.

In further embodiments, other different schemes may be implemented in assigning EIDs to requests of execution entities. Based on the EID associated with an instruction, a cache controller for the cache memory can keep track of which cache module of the multi-unit cache memory is to be used to store data accessed by the instruction. As a result, cache utilization may be improved since the individual cache modules may be configured to take advantage of the data usage characteristics of the different execution entities in the system. For example, a multimedia application may typically generate requests that transfer large blocks of data that are not re-used. A cache module assigned to these types of requests may be configured to implement the FIFO replacement policy and write-through update policy. Cache modules assigned to other types of requests may have different configurations.

Figure 6:
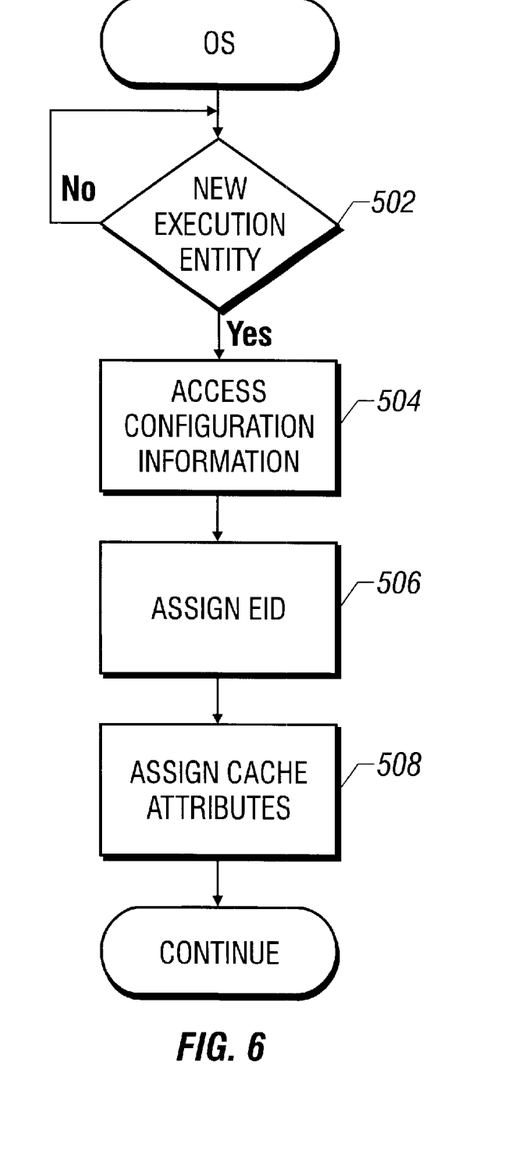
FIG. 6 is a flow diagram of an operating system in the system of FIG. 2 that sets up a cache memory according to an embodiment.

As execution entities are created in a system, EID identifiers may be assigned to these execution entities by an operating system. Referring to FIG. 6, according to one embodiment, if a new execution entity is detected (at 502), the operating system may access (at 504) configuration information loaded during system initialization to determine how EID identifiers are to be assigned. The operating system next assigns (at 506) the appropriate EID identifier to the execution entity. For example, the operating system may be able to assign three EIDs to correspond to three cache modules in a multi-unit cache memory. Execution entities having one general data usage characteristic may be assigned a first EID identifier, and execution entities having a second general data usage characteristic may be assigned a second EID identifier. A default EID identifier may be assigned to those execution entities that are not specifically assigned one of the other two EID identifiers.

In addition, based on the configuration information, the operating system also assigns (at 508) certain attributes of each cache module in the multi-unit cache memory. Such attributes may include the update, replacement, and placement policies. The operating system may also assign the attributes for the default cache module of the multi-unit cache memory. In alternative embodiments, the EID identifiers and cache attributes may be assigned as described above by a software layer that is separate from the operating system.

In one example, execution entities of a multimedia application that transfer large amounts of data and that do not typically reuse the data may be allocated one EID identifier so that such data are stored in a first cache module configured for the cache data usage characteristics of these execution entities. Execution entities of intensive arithmetic applications, such as compression applications, may be assigned another EID identifier so that data is stored in another cache module that is configured for cache data operations characterized by increased spatial locality.

In some embodiments, a multi-unit cache memory having multiple cache modules may be implemented in a multilevel cache memory having multiple levels of cache memory (e.g., an L1 cache and an L2 cache). Such a cache memory may be referred to as a multilevel, multi-unit cache memory, in which at least one level includes a multi-unit cache memory. Thus, for example, a multilevel, multi-unit cache memory having two levels may be constructed in the following manner: the first level is a multi-unit cache and the second level is a conventional cache; the first level is a multi-unit cache and the second level is a multi-unit cache; or the first level is a conventional cache and the second level is a multi-unit cache.

The individual cache modules of a multi-unit cache may be referred to as P-caches. Thus, for example, a multi-unit cache memory may include several P-caches, including a P0-cache, a P1-cache, a P2-cache, and so forth. The different P-caches may be implemented as separate memory elements or modules, e.g., multiple static random access memory (SRAM) or multiple dynamic random access memory (DRAM) devices. Alternatively, multiple P-caches may be implemented in one memory device that is sub-divided into separate sections to correspond to the different P-caches. In addition, the multi-unit cache memory may be integrated in another device, e.g., a processor or other control device in a system. Alternatively, the multi-unit cache memory may be a stand-alone unit accessible by control devices to retrieve cached data. In further embodiments, one portion of the multi-unit cache memory may be located in one integrated device while another portion of the multi-unit cache memory is located in another device.

In some embodiments of the invention, each individual P-cache module in a multi-unit cache system may have different attributes, including cache size and organization and cache update, placement, and replacement policies. A placement policy may be specified for each P-cache to determine how information is placed into unfilled portions of the cache. A cache replacement policy is specified to manage replacement of information stored in each P-cache. Example replacement polices may include a first-in-first-out (FIFO) policy, a least-recently-used (LRU) policy, or some other type of replacement policy. A cache update policy manages how information is to be updated when a write occurs to the cache, which may include a write-through policy or a write-back policy.

Figure 1:
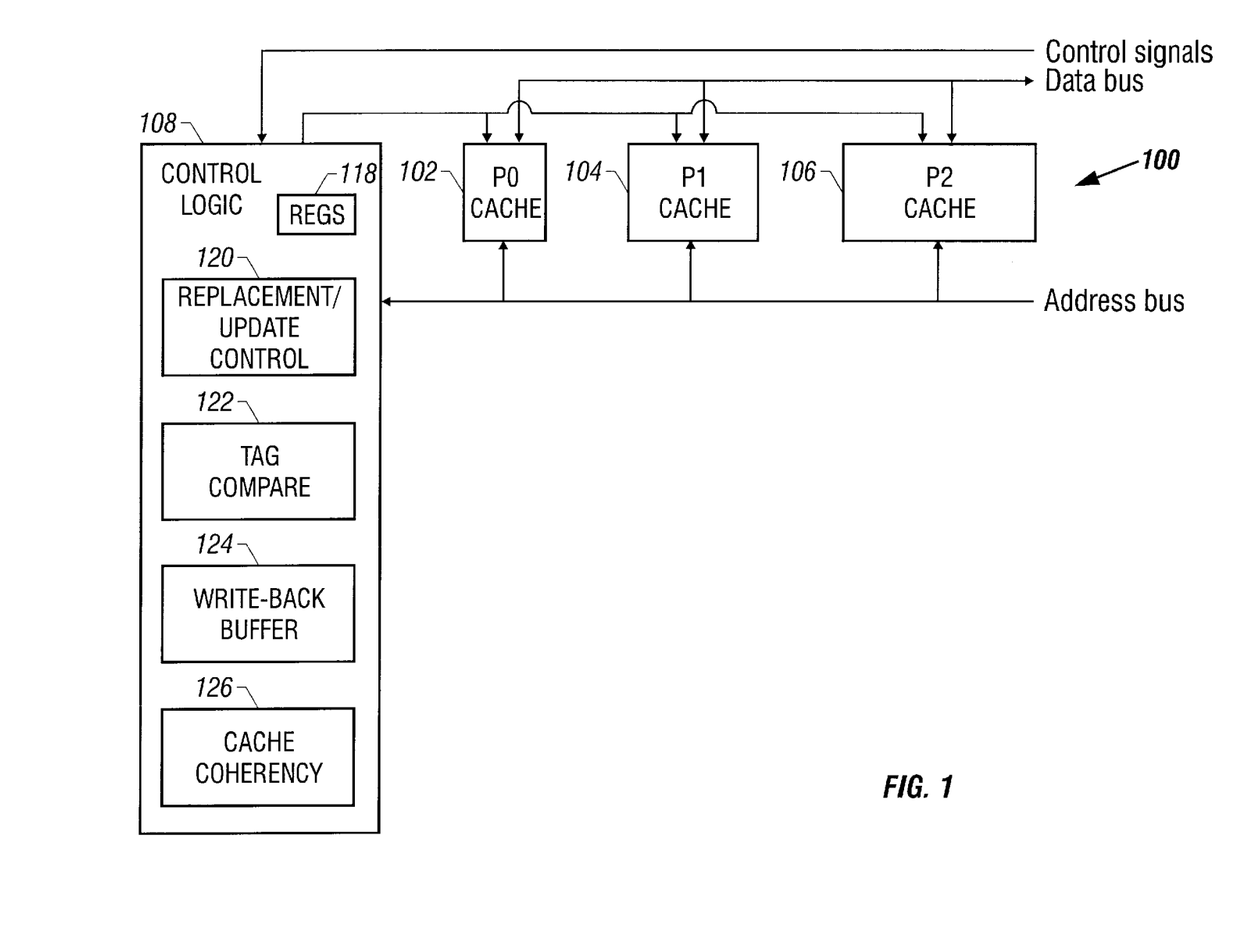
FIG. 1 is a block diagram of portions of a buffer or cache memory having multiple sections according to an embodiment of the invention.

Referring to FIG. 1, a multi-unit cache memory 100 according to an embodiment includes several P-caches, shown as a P0-cache 102, a P1-cache 104, and a P2-cache 106. A cache controller 108 is associated with the P0-, P1-, and P2-caches 102, 104, and 106. In one embodiment, separate address and data buses may be coupled to each of the cache modules 102, 104 and 106 so that the cache modules may be accessed concurrently. Alternatively, a common address and data bus may be coupled to the cache modules. The cache controller 108 provides control signals to each of the P-cache modules 102–106.

The cache controller 108 includes storage elements 118, in the form of registers or the like, that are programmable by the operating system to specify the EID identifiers associated with each of the P-caches. When the multi-unit cache memory 100 is accessed, the cache controller 108 selects one of the P-caches based on a comparison of the EID provided by a request and the EID values stored in the storage elements 118.

The cache controller 108 also includes a replacement and update control block 120 to control the replacement and update policies of the three separate cache modules, as determined by control information programmed in the storage elements 118. Thus, for example, the storage elements 118 may be programmed to indicate a FIFO replacement policy for one P-cache and an LRU replacement policy for another P-cache.

The cache controller 108 may also include a tag compare block 122 to compare the tag of an incoming request to the tag stored in the selected one or ones of the P-caches to determine if a cache hit has occurred. Further, if update of main memory 206 (FIG. 2) is needed, a write-back buffer 124 stores the cache line of one of the P-caches to transfer to main memory 206 or an L2 cache 204 (FIG. 2).

To ensure cache data integrity, the cache controller 108 also includes a cache coherency block 126 that determines if an accessed location of a cache module is valid. In one embodiment, each cache module may store a valid/invalid bit. Alternatively, a more sophisticated coherency protocol may be implemented, such as the Modified, Exclusive, Shared, and Invalid (MESI) protocol.

Other control signals that may be provided to the cache controller 108 may include a cache disable (CD) signal and a cache flush (CF) signal. In addition, other cache related signals such as snoop signals may be provided to the cache controller 108.

Figure 2:
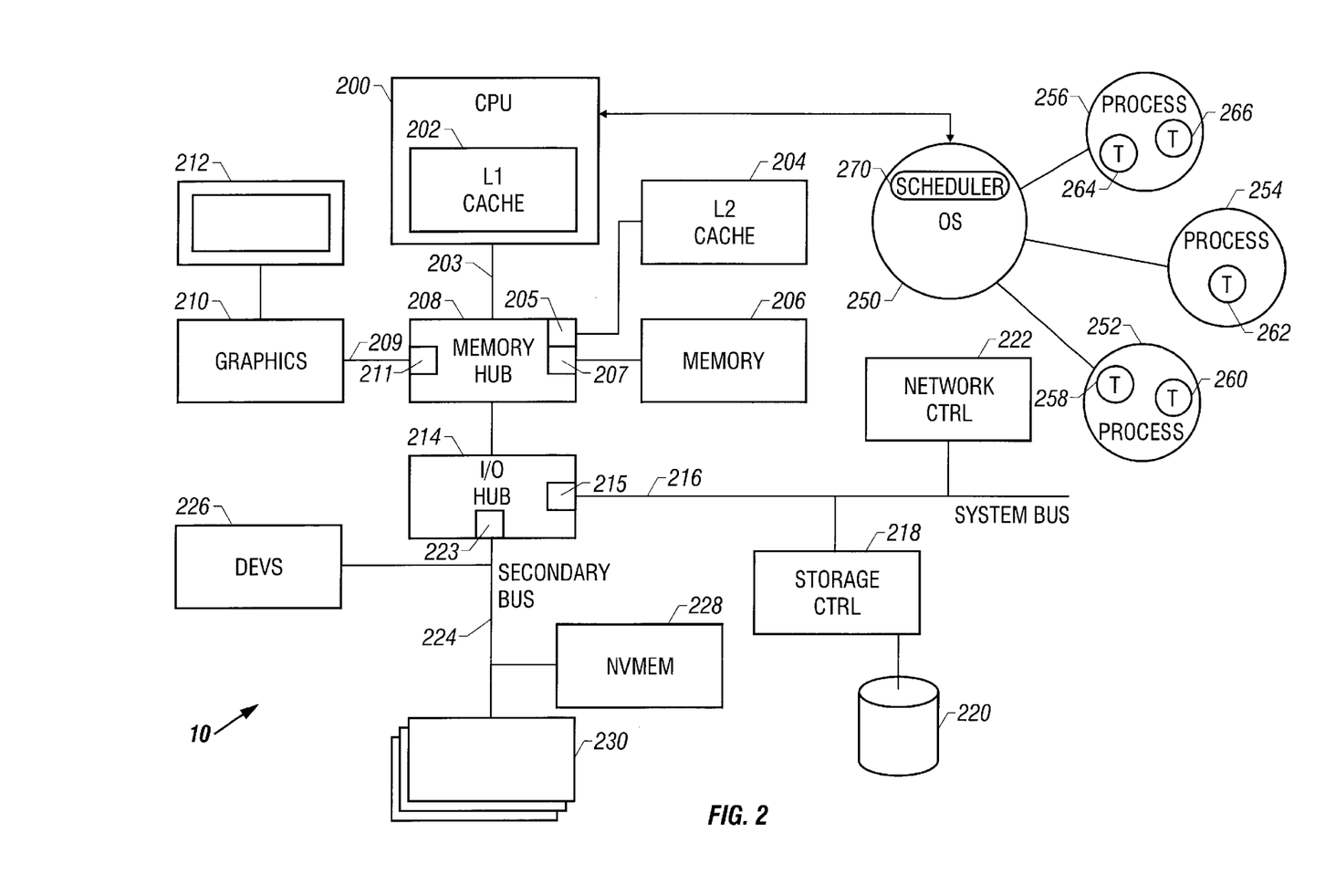
FIG. 2 is a block diagram of an embodiment of a system including the cache memory of FIG. 1.

Referring to FIG. 2, the multi-unit cache system 100 may be implemented in a number of different locations (e.g., processor subsystem, bridge controllers, peripheral device controllers, storage device controllers, and the like) in a system 10. In one embodiment, the system 10 includes a computer, although in alternative embodiments, the system 10 may be any other electronic device in which a cache or buffer memory may be implemented.

The system 10 includes a central processing unit (CPU) 200, which may include a processor or other suitable control device, having one or more levels of cache memory. For example, as illustrated, the CPU 200 may include an internal cache that is the level-one (L1) cache 202. In addition, the CPU 200 may be coupled over a host bus 203 to access an external cache that is the level-two (L2) cache 204. The L1 cache 202 may include a code component (for storing instructions) and a data component (for storing data). Similarly, the L2 cache 204 may include code and data components. Thus, instructions and data fetched from main memory 206 are stored in the code and data components, respectively, of the L1 or L2 cache 202 or 204. In other embodiments, separate code and data cache components are not implemented.

In some embodiments, the multi-unit cache memory 100 (FIG. 1) may be implemented in the L1 cache 202, the L2 cache 204, or both. For purposes of this discussion, it is assumed that the multi-unit cache memory 100 of FIG. 1 is implemented in the L1 cache 202 that is the internal cache of the CPU 200. It is to be understood, however, that the multi-unit cache memory described, or modifications of such a cache memory, may be implemented in the L2 cache 204 or in other controllers in the system, such as a video controller or a hard disk drive controller, as examples. In addition, in this embodiment, the multi-unit cache memory 100 forms the data cache component of the L1 cache 202.

The main memory 206 is controlled by a memory controller 207 in a memory hub 208 coupled to the CPU 200 over the host bus 203. In addition, the memory hub 208 may include a cache controller 205 operatively coupled to the L2 cache 204. The memory hub 208 may also include a graphics interface 211 that is coupled over a link 209 to a graphics controller 210, which is in turn coupled to a display 212. As an example, the graphics interface may be according to the Accelerated Graphics Port (A.G.P.) Interface Specification, Revision 2.0, published in May. 1998.

The memory hub 208 may also be coupled to an input/output (I/O) hub 214 that includes bridge controllers 215 and 223 coupled to a system bus 216 and a secondary bus 224, respectively. As an example, the system bus may be a Peripheral Component Interconnect (PCI) bus, as defined by the PCI Local Bus Specification, Production Version, Revision 2.1, published in Jun. 1995. The system bus 216 may be coupled to a storage controller 218 that controls access to one or more mass storage devices 220, including a hard disk drive, a compact disc (CD) drive, or a digital video disc (DVD) drive. In an alternative embodiment, the storage controller 218 may be integrated into the I/O hub 214, as may other control functions. The system bus 216 may also be coupled to other components, including, for example, a network controller 222 that is coupled to a network port (not shown).

On the secondary bus 224, additional devices 226 may be coupled, as may be a non-volatile memory 228 that may store power up routines, such as basic input/output system (BIOS) routines. The secondary bus 224 may also include ports for coupling to peripheral devices. Although the description makes reference to specific configurations and architectures of the various layers of the system 10, it is contemplated that numerous modifications and variations of the described and illustrated embodiments may be possible. For example, instead of memory and I/O hubs, a host bridge controller and a system bridge controller may provide equivalent functions, with the host bridge controller coupled between the CPU 200 and the system bus 216 and the system bridge controller 224 coupled between the system bus 216 and the secondary bus 224. In addition, any of a number of bus protocols may be implemented.

Various different program execution entities are executable by the CPU 200 in the system 10. As illustrated, according to one embodiment, multiple processes 252, 254, and 256 are loaded under an operating system 250, which may be a Windows® operating system, for example. Each process may generate one or more execution entities that form the basic units of work in the system. In one example, the execution entities may be threads; as illustrated in FIG. 2, the process 252 may include threads 258 and 260, the process 254 may include a thread 262, and the process 256 may include threads 264 and 266.

Various software or firmware (formed of modules, routines, or other layers, for example), including applications, operating system modules or routines, device drivers, BIOS modules or routines, and interrupt handlers, may be stored or otherwise tangibly embodied in one or more storage media in the system. Storage media suitable for tangibly embodying software and firmware instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the storage media when executed cause the system 10 to perform programmed acts.

The software or firmware can be loaded into the system 10 in one of many different ways. For example, instructions or other code segments stored on storage media or transported through a network interface card, modem, or other interface mechanism may be loaded into the system 10 and executed to perform programmed acts. In the loading or transport process, data signals that are embodied as carrier waves (transmitted over telephone lines, network lines, wireless links, cables and the like) may communicate the instructions or code segments to the system 10.

The execution entities (in this case threads) are adapted to perform different operations. For example, a spreadsheet process may create a first thread to perform calculations on entries entered by a user and a second thread to transfer the calculated data into main memory 206. Each thread or execution entity is able to generate requests, which are stored as instructions in main memory 206. These instructions are fetched by the CPU 200 from main memory 206 for execution.

According to some embodiments, an execution entity identifier (EID) may be assigned to each execution entity running in the system 10. The EID of each execution entity may be assigned by the operating system. In one embodiment, when a scheduler 270 schedules requests from the execution entities for processing by the CPU 200, the associated EID of each execution entity is stored along with one or more corresponding instructions. In this embodiment, the CPU 200 fetches the associated EIDs along with the instructions.

In an alternative embodiment, the EIDs are not stored into memory 206 along with instructions. Instead, multiple instruction memory regions may be defined in the memory 206 to correspond to the different EIDs. Instructions associated with a request from an execution entity having a first EID may be stored in a first instruction memory region; instructions associated with a request from an execution entity having a second EID may be stored in a second instruction memory region; and so forth. In this alternative embodiment, the CPU 200 fetches instructions from memory 206 without associated EIDs. However, based on which of the instruction memory regions the instruction is fetched, the CPU 200 can determine the EID of the instruction.

In yet a further embodiment, in which EIDs are similarly not stored along with instructions, the CPU 200 may include multiple microsequencers assigned to different threads. Thus, one microsequencer may retrieve instructions associated with one thread, another microsequencer may retrieve instructions associated with another thread, and so forth. Each microsequencer may be configured to know locations of instructions of corresponding execution entities. In this embodiment, an instruction's EID may be determined depending on which of the microsequencers fetched that instruction. The determined instruction may then be stored inside the CPU.

The retrieved or determined EID is decoded by the cache controller 108 or by some other suitable decoder to identify which P-cache is to be used when the instruction requests an access to data. The cache controller 108 accesses one of the P-caches to retrieve or store data processed by the corresponding instruction. With the example configuration of FIG. 1, data associated with instructions having EID 0 may be stored in the P0-cache 102, data associated with instructions having EID 1 may be stored in the P1-cache 104, and data associated with instructions having EID 2 may be stored in the P2-cache 106. In some embodiments, a P-cache may be associated with more than one EID. Further, execution entities from different application and software layers may be assigned the same EID.

Figure 3:
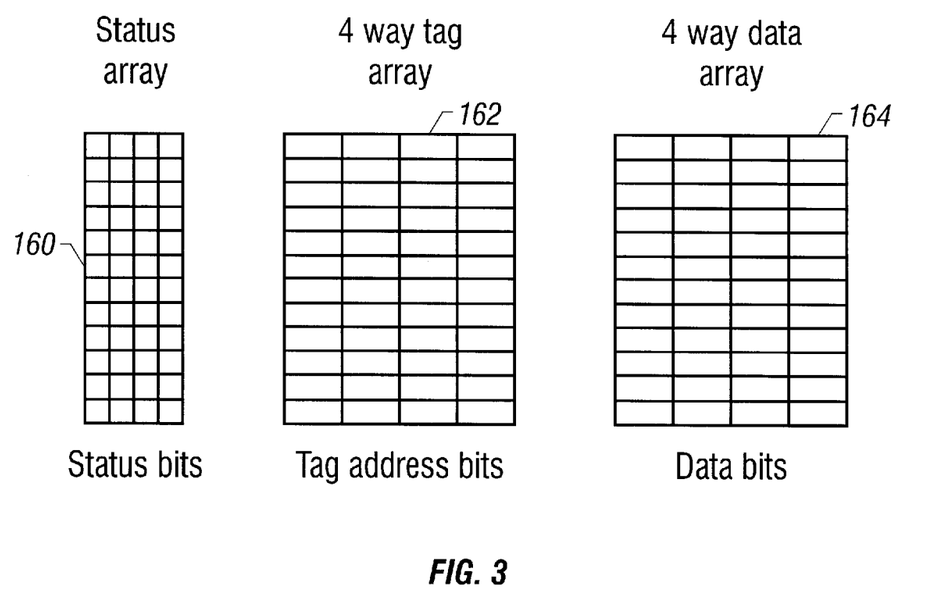
FIG. 3 illustrates the components of each cache module in the cache memory of FIG. 1.

Referring to FIG. 3, the general architecture of one of the P-caches is illustrated. In the example shown in FIG. 3, a 4-way set-associative cache is illustrated. Other configurations are also possible, including a direct mapped cache or other k-way set-associative caches. Each P-cache may include a status array 160, a tag array 162, and a data array 164. As illustrated, each of the status array 160, tag array 162, and data array 164 is divided into 4 different sections for the 4-way set-associative organization.

The status array 160 may contain one or more of the following fields: an EID identifier; replacement selection bits (RPS) that are used by the replacement and update control block 120 to replace a cache line; and cache coherency protocol bits. For example, each block of the P-cache module may be associated with a valid/invalid bit to indicate if the corresponding cache location is valid or invalid. Alternatively, the status array 160 may store MESI bits. The replacement selection bits RPS may be used to indicate which cache line is to be replaced. The RPS bits may be used to keep track of the least recently used cache line (for LRU replacement) or the first entered line (for FIFO replacement), as examples.

The cache controller 108 may be implemented as an integrated unit or as several separate control units. As discussed, when an instruction is fetched for execution, the EID associated with the instruction is retrieved. Based on the EID value, the appropriate one of the P-cache modules is selected to retrieve data from or write data to. A hit or miss may be returned depending on whether a valid copy of the associated data is stored in the selected P-cache module.

A multi-unit cache system having independently configurable cache modules according to some embodiments may have one or more of the following advantages. Greater cache management flexibility may be available, since the placement, replacement, and update policies and cache size and organization of each of the P-cache modules may be set to improve cache utilization for corresponding execution entities. Cache performance may be improved by configuring cache modules to take advantage of different cache usage characteristics (to store data or instructions) of different execution entities. Data cache pollution by the different active execution entities in the system 10 may be reduced, which may improve the cache hit ratio. In addition, the multi-unit data cache system may offer high access bandwidth by increasing parallelism for a multithreading or multitasking processor since the P-cache modules may be concurrently accessible. Such concurrent data cache accesses may help reduce data cache latency to help meet the data access bandwidth demands of high-performance processors.

In another embodiment, compilers for different application programs may dynamically reconfigure attributes of the multi-unit cache memory to further enhance cache performance. For example, during operation, statistical information associated with different execution entities may be collected and stored. Depending on the collected statistical information, the attributes of each P-cache module may be changed. Thus, for example, if a FIFO replacement policy is determined not to be efficient for a particular P-cache module, the cache controller 108 may be notified to change the replacement policy to the LRU policy or some other replacement policy. This alternative embodiment may provide the flexibility of dynamically changing the configuration of individual P-cache modules in response to how execution entities in the system 10 are performing.

Figure 4:
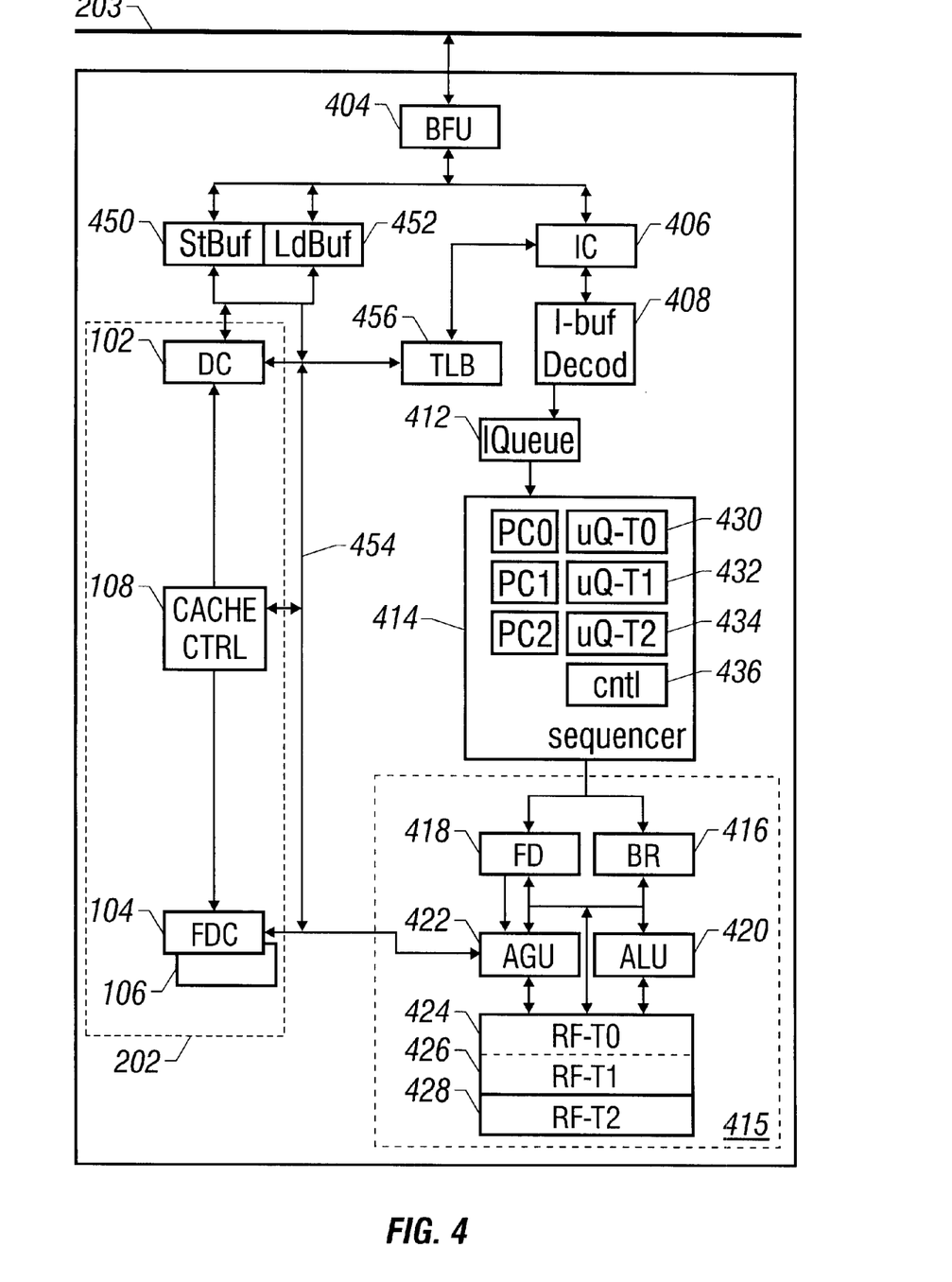
FIG. 4 is a block diagram of a processor including the cache memory of FIG. 1 along with associated control logic.

Referring to FIG. 4, in one embodiment, the CPU 200 includes the multi-unit L1 cache memory 202 and associated logic. The multi-unit L1 cache memory includes the three data cache modules: the P0-, P1-, and P2-caches 102, 104, and 106. The P0-cache 102 may be designated as the default data cache that is used to store data associated with execution entities that have not specifically been assigned to one of the other P-caches in the L1 cache. For example, such execution entities may be assigned a default EID 0 by the operating system. The P1- and P2-caches 104 and 106 may be assigned to store data for requests from execution entities having EIDs 1 and 2, respectively. In one embodiment, the P0-cache may be a larger memory than either the P1- or P2-cache since it is the default data cache.

Other components of the CPU 200 according to one example configuration are illustrated in FIG. 4. A bus front unit (BFU) 404 forms the interface to the front side or host bus 203. The BFU 404 may include address drivers and receivers, write buffers, data bus transceivers, bus control logic, bus master control, and parity generation and control.

The instruction path is first described below. Instructions retrieved by the BFU 404 from either the main memory 206 or from the L2 cache 204 may be stored in an instruction cache 406 that is part of the L1 cache 202. The internal instruction cache 406 may keep copies of the most frequently used instructions. According to some embodiments, instructions are fetched along with EIDs from either the main memory 206 or the L2 cache 204 and stored in the instruction cache 406. An instruction buffer and decode logic 408 decodes a selected instruction and associated EID from the instruction cache 406 and produces one or more micro-operations along with corresponding EIDs.

In an alternative embodiment, the instructions are stored in different instruction memory regions of the memory 206 according to different EIDs. However, in this embodiment, the EIDs are not stored along with the instructions. When the CPU 200 fetches an instruction, an associated EID is not retrieved. Instead, the CPU 200 determines the EID of the fetched instruction based on the address location where the instruction is stored. This may be performed, for example, by the decode logic 408. Thus, the EID of an instruction is determined based on which instruction memory region the instruction is fetched from. Once the EID is determined by the CPU 200, it can be attached to the decoded micro-operations and stored in the instruction queue 412.

In yet a further embodiment in which EIDs are not stored along with instructions in memory, multiple program counters and microsequencers may be included in the CPU 200 that are assigned to corresponding threads. This embodiment is described further below.

The output port of the instruction buffer and decode logic 408 may be coupled to an instruction queue 412, which stores the micro-operations along with associated EIDs. The output port of the instruction queue 412 is routed to a sequencer 414. The sequencer 414 may include multiple microsequencer units 430, 432, and 434 corresponding to the different EIDs. For example, the microsequencer unit 430 may be configured to process micro-operations associated with EID 0, the microsequencer 432 may be configured to process micro-operations associated with EID 1, and the microsequencer 434 may be configured to process micro-operations associated with EID 2. The micro-operations processed by the microsequencers 430, 432, and 434 are received from the instruction queue 412. According to one embodiment, the microsequencers 430, 432, and 434 may operate simultaneously to process micro-operations associated with different EIDs. Operation of the microsequencers 430, 432, and 434 are controlled by a control logic 436 in the sequencer 414.

In one embodiment, the EIDs associated with micro-operations are originally retrieved from memory along with instructions of the different execution entities. In a further embodiment in which instructions are are not stored along with instructions, each microsequencer may be independently configured to fetch instructions of corresponding execution entities. Thus, a first microsequencer fetches instructions associated with a first execution entity, a second microsequencer fetches instructions associated with a second execution entity, and so forth. The EIDs of a fetched instruction may thus be determined based on which of the microsequencers fetched the instruction.

An execution entity typically includes a number of instructions that are executed in some program order. By default, instruction addresses are simply incremented to fetch the next instruction. If a jump or other conditional branch occurs, then a target address is specified for the address of the next instruction. Thus, the address of the memory location where the next instruction is stored is known. A program counter may be used to keep track of the program order of instructions. A microsequencer works in conjunction with the program counter to execute instructions. To fetch an instruction, the microsequencer may ask a fetch unit, located in the BFU 404 for example, to fetch an instruction with an address stored in the program counter. Thus, fetched instructions may be identified as belonging to an execution entity since the microsequencer already knows (from the program counter) the address of the next instruction.

Thus, for example, given a system with several threads, two or more independent program counters may be used. For example, three program counters PC0, PC1, and PC2 may be associated with microsequencers 430, 432, and 434, respectively. The operating system may load the initial states of the program counters PC0, PC1, and PC2 so that the program counters may fetch instructions associated with the different threads. The combination of PC0 and microsequencer 430 keeps track of the program sequence for a first thread, the combination of PC1 and microsequencer 432 keeps track of the program sequence for a second thread, and so forth. When an instruction pointed to by PC0 is fetched, the CPU 200 knows that the instruction belongs to a first thread having, for example, EID 0. The EID is then attached to the instruction in the CPU 200 and to subsequently decoded micro-operations that are stored in the instruction queue 412 for execution by the microsequencer 430, 432, or 434 in the sequencer 414.

As shown in FIG. 4, the output port of the sequencer 414 is provided to a pipeline back-end block 415 that includes various functional units, such as for example, an early branch execution unit 416, a fast decoder unit 418, an arithmetic/logic unit (ALU) 420, and an address generator unit (AGU) 422. During execution of one or more micro-operations by the sequencer 414, these functional units may be accessed to perform requested functions.

The pipeline back-end block 415 also includes register files 424, 426, and 428. The register files 424, 426 and 428 in the CPU 200 correspond to the three EID groups EID 0, EID 1, and EID 2. The register files 424, 426 and 428 may each include control registers, status registers, flag registers, and general purpose registers. The register files 424, 426, and 428 are updated by the functional units in the pipeline back-end block 415 during operation. According to one embodiment, the register files 424, 426, and 428 may also be accessible independently and concurrently.

In the illustrated embodiment, requests associated with different EIDs may be processed concurrently provided that there are no dependencies among the requests, and further, the multiple requests do not need to utilize the same functional units 416, 418, 420, and 422. During concurrent operation of the microsequencers 430, 432, and 434, the register files 424, 426, and 428 as well as the cache modules in the multi-unit cache memory may be accessed and updated concurrently.

In the data path of the CPU 200, a store buffer 450 (for write operations) and a load buffer 452 (for read operations) store data that are retrieved from or targeted for the BFU 404. The store and load buffers 450 and 452 are coupled to an internal data bus 454 that is coupled to several units, including the P0-cache 102, the P1-cache 104, the P2-cache 106, the pipeline back-end block 415, and a translation look aside buffer (TLB) 456.

Addresses of instructions in the instruction cache 406 are fed to the TLB 456, which is basically a high speed memory in the CPU 200 that translates the virtual address from the instruction cache 406 into a physical address to access the data cache modules 102, 104 and 106. Based on the multi-unit data cache availability, the control logic 436 in the microcode sequencer 414 may select an appropriate instruction for processing by one of the microsequencers 430, 432, and 434. If data access is needed, the microsequencers 430, 432, and 434 may concurrently access the several modules in the multi-unit data cache. Thus, to improve system performance, multiple instructions may be executed in the CPU 200 with concurrent access to data in the L1 multi-unit cache 202.

In some embodiments, the control logic 436 of the sequencer 414 may also consider possible load/store ordering, outstanding data cache refilling, and other issues. For example, in one embodiment, instructions associated with a request that has been determined to have a high hit ratio may be scheduled first, as may instructions of a real-time constrained execution entity having high priority.

Figure 5:
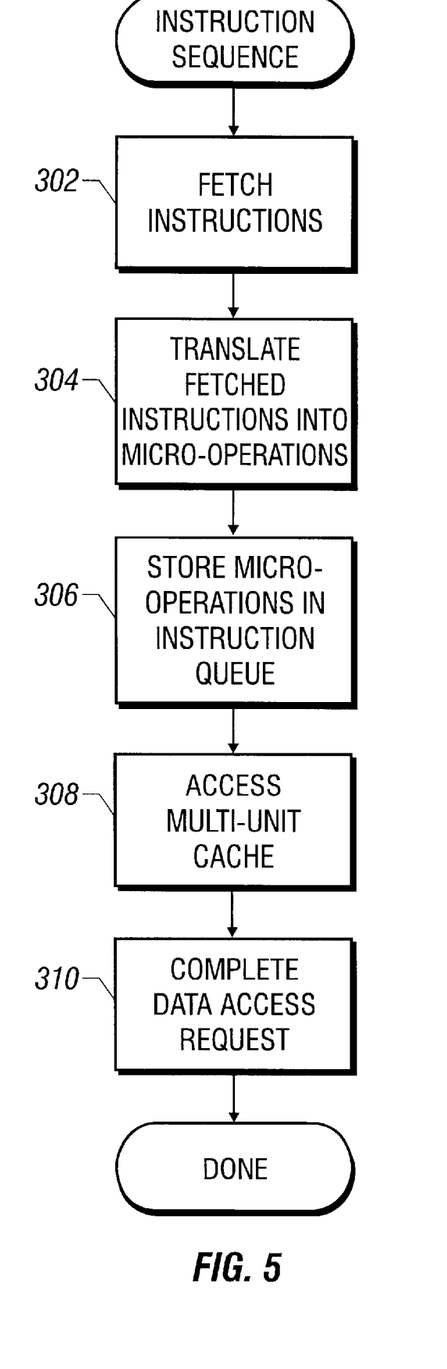
FIG. 5 is a flow diagram of an instruction execution sequence performed in the processor of FIG. 4.

Referring to FIG. 5, the general flow of an instruction execution sequence according to an embodiment is illustrated. Instructions are fetched from main memory 206 or L2 cache 204 (at 302) by the CPU 200 over the host bus 203. In one embodiment, associated EIDs are retrieved with the instructions. In another embodiment, the associated EIDs are not stored and thus are not retrieved. The fetched instructions are then translated into internal micro-operations (at 304) by the decoder stage 408, with a corresponding EID attached to each micro-operation. The EID may be the one fetched with the instruction or it may be determined by the CPU 200 based on the address location of the instruction or which microsequencer fetched the instruction. Next, the translated micro-operation is stored in the instruction queue 412 (at 306). The micro-operation is then delivered to one of the microsequencers 430, 432, and 434 for execution (at 308). Execution of the micro-operation may cause a data cache access request to be made (at 310), in which case a corresponding one of the P-cache modules is accessed based on the attached EID. The EID is decoded by the cache controller 108 and an appropriate request is sent to a corresponding P-cache (102, 104, or 106). The data access request is then completed in the assigned P-cache (at 312).

While the embodiments described include a multi-unit cache memory to store data, it is contemplated that the multi-unit cache memory may be adapted to store instructions of different execution entities in further embodiments. In such embodiments, the information stored in the multi-unit cache memory includes the instructions themselves.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system comprising:

a processor;

a plurality of execution entities executable on the processor; and a cache memory having multiple cache sections, each cache section adapted to store information associated with requests from a corresponding one of the multiple execution entities, wherein at least two of the cache sections have different attributes, each attribute selected from the group consisting of a cache line replacement policy and cache update policy.

2. The system of claim 1, further comprising a software layer adapted to assign identifiers to the execution identifiers and to assign each buffer section an identifier.

3. The system of claim 2, further comprising a controller operatively coupled to the buffer memory to select one of the buffer sections based on an identifier associated with a request from an execution entity.

4. The system of claim 1, wherein the execution entities include processes.

5. The system of claim 1, wherein the execution entities include threads.

6. The system of claim 1, wherein the cache memory includes a multi-level cache memory in which at least one level includes a multi-unit cache memory having multiple cache sections.

7. The system of claim 1, wherein the execution entities process data according to different temporal and spatial locality characteristics, and each buffer section is configured based on the temporal and spatial locality characteristics.

8. The system of claim 1, wherein the processor comprises plural microsequencers, a first one of the microsequencers to execute a first one of the execution entities, and a second one of the microsequencers to execute a second one of the execution entities.

9. The system of claim 8, the first and second ones of the microsequencers to execute the first and second ones of the execution entities concurrently.

10. A method of setting up a cache memory having multiple cache sections, the cache memory located in a system having multiple execution entities, the method comprising:

assigning an identifier to each execution entity based on which of the multiple cache sections is to be used for the execution entity; and configuring each of the cache sections to have an attribute based on the cache usage characteristics of the one or more execution entities assigned to the cache section, wherein at least two of the cache sections have different attributes, each attribute selected from the group consisting of a cache line replacement policy and cache update policy.

11. The method of claim 10, further comprising executing a first one of the execution entities on a first microsequencer in a processor, and executing a second one of the execution entities on a second microsequencer in the processor.

12. The method of claim 11, wherein the first and second ones of the execution entities are executed concurrently by the first and second microsequencers.

13. An article including a storage medium containing instructions for managing memory in a system, the system having a processor, a memory with multiple memory sections, and multiple execution entities executable on the processor, the instructions when executed causing the system to:

assign each memory section to correspond to one or more of the execution entities; and configure attributes of each of the memory sections based on the memory usage characteristics of the one or more execution entities assigned to the memory section, each attribute selected from the group consisting of a cache line replacement policy and a cache update policy.

14. A processor located in a system having multiple execution entities, comprising:

a cache memory having multiple cache sections each assigned to an execution entity; and a sequencer having multiple segments each assigned to an execution entity, the sequencer adapted to receive instructions from multiple execution entities, each segment of the sequencer to execute the received instructions concurrently and accessing the cache sections concurrently during execution.

15. A system comprising:

program execution entities associated with identifiers;

a multi-unit cache memory having multiple cache sections adapted to store information associated with requests from the execution entities, each cache section storing the information based on an identifier, wherein the requests contain instructions; and a processor having a plurality of program counters and corresponding microsequencers, each microsequencer adapted to fetch instructions associated with a corresponding execution entity based on an address contained in the program counter.

16. The system of claim 15 further comprising a memory in which requests and associated identifiers are stored.

17. The system of claim 15, wherein the requests include instructions, the system further comprising a processor having a plurality of program counters and corresponding microsequencers, each microsequencer adapted to fetch instructions associated with a corresponding execution entity based on an address contained in the program counter.

18. The system of claim 15, wherein the identifier of an instruction is determined based on which microsequencer fetched the instruction.

19. The system of claim 15, wherein the microsequencers use different ones of the cache sections.

20. The system of claim 15, wherein the microsequencers are adapted to execute concurrently.

* * * * *